United States Patent
Arita et al.

(10) Patent No.: US 6,613,136 B1
(45) Date of Patent: Sep. 2, 2003

(54) RECORDING INK COMPOSITION AND INK-JET PRINTING METHOD USING THE SAME

(75) Inventors: Hitoshi Arita, Kanagawa (JP); Kiyofumi Nagai, Tokyo (JP); Akiko Bannai, Tokyo (JP); Masayuki Koyano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/662,866

(22) Filed: Sep. 15, 2000

(30) Foreign Application Priority Data

Sep. 17, 1999 (JP) .......................................... 11-263445

(51) Int. Cl.$^7$ ............................................. C09D 11/00
(52) U.S. Cl. ............................... 106/31.58; 106/31.59; 106/31.86; 106/31.89
(58) Field of Search ............................ 106/31.58, 31.59, 106/31.86, 31.89

(56) References Cited

U.S. PATENT DOCUMENTS

| | | | |
|---|---|---|---|
| 4,647,310 A | 3/1987 | Shimada et al. | 106/31.48 |
| 4,711,668 A | 12/1987 | Shimada et al. | 106/31.48 |
| 4,793,860 A | 12/1988 | Murakami et al. | 106/31.52 |
| 5,395,434 A * | 3/1995 | Tochihara et al. | 106/31.43 |
| 5,431,720 A | 7/1995 | Nagai et al. | 106/31.43 |
| 5,514,208 A | 5/1996 | Nagai et al. | 106/31.43 |
| 5,619,765 A | 4/1997 | Tokita et al. | |
| 5,622,550 A | 4/1997 | Konishi et al. | |
| 5,782,254 A | 7/1998 | Tanikawa et al. | |
| 5,810,915 A | 9/1998 | Nagai et al. | |
| 5,851,717 A | 12/1998 | Tsubuko et al. | |
| 5,879,439 A | 3/1999 | Nagai et al. | 106/31.49 |
| 5,882,390 A | 3/1999 | Nagai et al. | 106/31.28 |
| 5,955,515 A * | 9/1999 | Kimura et al. | 106/31.13 |
| 5,968,301 A | 10/1999 | Murakami et al. | |
| 5,972,082 A | 10/1999 | Koyano et al. | 106/31.27 |
| 5,993,524 A | 11/1999 | Nagai et al. | 106/31.27 |
| 6,019,827 A * | 2/2000 | Wickramanayake et al. | 106/31.25 |
| 6,020,103 A | 2/2000 | Tsubuko et al. | |
| 6,120,589 A | 9/2000 | Bannai et al. | 106/31.27 |
| 6,204,307 B1 * | 3/2001 | Miyabayashi | 106/31.6 |
| 6,231,652 B1 | 5/2001 | Koyano et al. | |
| 6,261,349 B1 | 7/2001 | Nagai et al. | |
| 6,287,374 B1 * | 9/2001 | Yanagida et al. | 106/31.9 |
| 6,372,818 B1 * | 4/2002 | Kimura et al. | 523/161 |
| 6,439,713 B1 | 8/2002 | Noguchi et al. | |

* cited by examiner

*Primary Examiner*—Mark L. Bell
*Assistant Examiner*—Veronica F. Faison
(74) *Attorney, Agent, or Firm*—Oblon, Spivak, McClelland, Maier & Neustadt, P.C.

(57) ABSTRACT

A recording ink composition having a colorant insoluble and dispersible in water, water, a water-soluble organic solvent, a wetting agent, 2-ethyl-1,3-hexanediol, and at least one of surfactants of formulas (I) to (V):

$$R^1-O-(CH_2CH_2O)_mCH_2COO^-M^+ \quad \text{(I)}$$

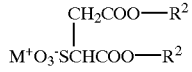

(II)

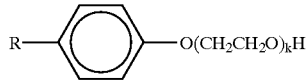

(III)

$$R-(OCH_2CH_2)_nOH, \quad \text{and} \quad \text{(IV)}$$

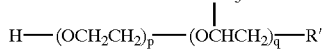

(V)

wherein $R^1$, $R^2$, R, R', $M^-$, m, k, n, p, and q are specified in the specification.

15 Claims, No Drawings

RECORDING INK COMPOSITION AND INK-JET PRINTING METHOD USING THE SAME

BACKGROUND OF THE INVENTION

1. Field of the Invention

The present invention relates to a recording ink composition, and more particularly to an aqueous recording color ink composition capable of producing color images on a sheet of plain paper by an ink-jet printing method, and suitable for an ink-jet printer, aqueous writing utensils, various kinds of recorders, and pen plotters. Also, the present invention relates to an ink-jet printing method using the above-mentioned recording ink composition.

2. Discussion of Background

Ink-jet printers have been widely utilized in recent years because of the advantages of low noise and low running cost, and color ink-jet printers capable of producing color images on a sheet of plain paper have also been on the market.

However, it is extremely difficult to obtain a color ink composition capable of meeting with the requirements for the produced image, for example, color reproduction, water resistance, light resistance, drying characteristics, prevention of blurring, and the reliability of ink-ejection. In particular, when the color images are produced using the ink-jet color printer, image blurring easily takes place in two-color-superimposed portions such as red, green, and blue color image portions, even though image clearness is sufficient in single color image portions formed by use of a yellow, magenta, or cyan color ink composition.

When the ink images deposited on a sheet of paper are dried without using any specific image fixing unit, the drying characteristics of the ink image are improved by increasing the penetrating properties of the ink through paper as described in Japanese Laid-Open Patent Application No. 55-29546. In this case, however, the improved penetrating properties of the ink through paper generate the problem of image blurring.

Japanese Patent Publication No. 60-23793 describes that a dialkylsulfosuccinic acid is contained in the ink composition as a surfactant, whereby the drying characteristics of the ink images can be improved and deterioration of image quality can be minimized. However, when such an ink composition is used for ink-jet printing, the diameters of picture elements of the obtained image considerably vary depending on the kind of image receiving sheet to be employed. The image density of the printed images is also considerably decreased. Further, if the ink composition is alkaline, this kind of surfactant is easily decomposed and the effect of the surfactant is diminishing during the storage of the ink composition.

Japanese Patent Publication No. 58-6752 discloses a quick-drying ink composition. By employing an ethylene oxide adduct having an acetylene bond as a surfactant in the ink composition, penetration of the ink is promoted to obtain quick-drying ink images with no image blur. However, the drying speed cannot be improved depending on the kind of dye used in the ink composition. For example, hydrophobic interaction between the surfactant and a direct dye such as "DBK168" (Trademark) inhibits the increase of drying speed.

Japanese Laid-Open Patent Application Ser. No. 56-57862 discloses an ink composition containing a strongly basic material. In the case where ink images are formed using this ink composition on an acidic paper which has been prepared using rosin as a sizing agent, the drying characteristics of the images can be improved. However, no improvement is observed in the drying characteristics of ink images when the ink images are formed on a paper manufactured using an alkyl ketene dimer or an alkenyl sulfosuccinic acid as the sizing agent. Even when acidic paper is employed, the drying characteristics of the two-color-superimposed image portion are not improved.

Japanese Laid-Open Patent Application No. 1-203483 discloses a recording ink composition comprising a polyhydric alcohol derivative and pectin. The pectin serves as a thickening agent for preventing the image blurring. However, the pectin is a nonionic material having hydroxyl group as a hydrophilic group, so that there is the shortcoming that ink ejection reliability is low when the printing operation is resumed after intermission.

Japanese Laid-Open Patent Application No.2-36276 discloses an ink composition comprising 2-propanol for improving the frequency response properties and the image fixing properties. However, this ink composition causes the problem of safety in terms of toxicity and flammability.

No pigment-containing ink composition of a penetrating type has been on the market. It has been considered that such a pigment-containing ink composition can be achieved only by using the commercially available surfactant "Surfy-nol" (Trademark), made by Air Products and Chemicals, containing a polysilanol group, and using butyl ether as a penetrating agent. However, butyl ether reacts with a pigment dispersant to form an agglomerate of pigment, and the above-mentioned surfactant "Surfy-nol" also tends to form an agglomerate of a pigment such as a functional-group-addition type carbon black.

SUMMARY OF THE INVENTION

A first object of the present invention is to provide a recording ink composition, in particular, an aqueous ink composition suitable for an ink-jet printing, with excellent penetrating properties, capable of producing ink images with excellent drying characteristics and minimum deterioration. Specifically, the first object is to provide a pigment-containing ink composition not by using "Surfy-nol" as a surfactant and butyl ether as a penetrating agent.

A second object of the present invention is to provide a method of recording images on an image-receiving medium. More specifically, the second object is to provide an ink-jet recording method with ink-ejecting reliability using a recording ink composition which is excellent from the view point of safety.

The first object can be achieved by a recording ink composition comprising a colorant insoluble and dispersible in water, water, a water soluble organic solvent, a wetting agent, 2-ethyl-1,3-hexanediol, and a surfactant selected from the group consisting of surfactants of formulas (I) to (V):

$$R^1—O—(CH_2CH_2O)_mCH_2COO^-M^+ \qquad (I)$$

wherein $R^1$ is a straight-chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12,

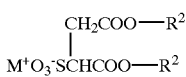 (II)

wherein $R^2$ is a branched alkyl group having 5 to 16 carbon atoms, and $M^+$ is a cation selected from the group consisting of alkali metal cation, quaternary ammonium cation, quaternary phosphonium cation, and alkanol amine cation,

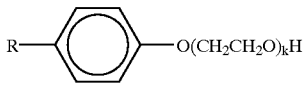 (III)

wherein R is a straight or branched carbon chain having 6 to 14 carbon atoms, and k is an integer of 5 to 20

 (IV)

wherein R is a straight or branched carbon chain having 6 to 14 carbon atoms; and k is an integer of 5 to 20, and

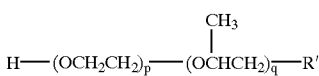 (V)

wherein R' is a carbon chain having 6 to 14 carbon atoms, and p and q are each an integer of 20 or less.

The second object can be achieved by a method of recording images on an image receiving medium, comprising the step of ejecting the above-described recording ink composition in the form of droplets from a recording head onto the image receiving medium, thereby forming images thereon.

DESCRIPTION OF THE PREFERRED EMBODIMENTS

The recording ink composition of the present invention comprises 2-ethyl-1,3-hexanediol, preferably in an amount of 0.1 to 7.0 wt. %, and at least one surfactant selected from the aforementioned surfactants of formulas (I) to (V), preferably in an amount of 0.1 to 5.0 wt. % of the total weight of the recording ink composition. As a result, the wettability of heating elements by the ink is improved, so that the ink ejection performance and the frequency response performance are stabilized. Furthermore, the problem of safety caused by the addition of 2-propanol, which would be used to achieve the ink ejection stability, can be solved by the present invention.

The surfactants (I) to (V) are as follows:

 (I)

wherein $R^1$ is a straight-chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12,

 (II)

wherein $R^2$ is a branched alkyl group having 5 to 16 carbon atoms, and $M^+$ is a cation selected from the group consisting of alkali metal cation, quaternary ammonium cation, quaternary phosphonium cation, and alkanol amine cation,

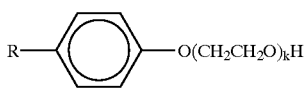 (III)

wherein R is a straight or branched carbon chain having 6 to 14 carbon atoms, and k is an integer of 5 to 20,

 (IV)

wherein R is a straight or branched carbon chain having 6 to 14 carbon atoms, and k is an integer of 5 to 20, and

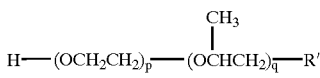 (V)

wherein R' is a carbon chain having 6 to 14 carbon atoms, and p and q are each an integer of 20 or less.

In the formulas (I) and (II), the alkali metal cation represented by $M^+$ is selected from the group consisting of $Na^+$ and $Li^+$; the quaternary ammonium cation represented by $M^+$ is a cation represented by formula (VI),

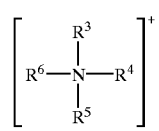 (VI)

wherein $R^3$ to $R^6$ are each selected from the group consisting of a hydrogen atom, an alkyl group having 1 to 4 carbon atoms, and a halogenated alkyl group having 1 to 4 carbon atoms; the quaternary phosphonium cation represented by $M^+$ is a cation represented by formula (VII),

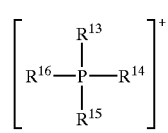 (VII)

wherein $R^{13}$ to $R^{16}$ are each selected from the group consisting of a hydrogen atom, an alkyl group having 1 to 4 carbon atoms, a hydroxyalkyl group having 1 to 4 carbon atoms, and a halogenated alkyl group having 1 to 4 carbon atoms; and the alkanolamin cation represented by $M^+$ is a cation represented by formula (VIII),

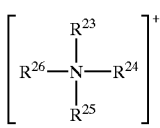
(VIII)

wherein at least one of $R^{23}$ to $R^{26}$ is a hydroxyalkyl group having 1 to 4 carbon atoms, and the other is selected from the group consisting of a hydrogen atom, an alkyl group having 1 to 4 carbon atoms, and a halogenated alkyl group having 1 to 4 carbon atoms.

As the colorant for use in the present invention, any inorganic and organic pigments can be used. The inorganic pigments are not particularly limited. For example, not only titanium oxide and iron oxide, but also carbon black manufactured by any conventional methods such as a contact method, a furnace method, and a thermal method can be employed.

Examples of the organic pigments are azo pigments including azo lake, insoluble azo pigment, condensation azo pigment, and chelate azo pigement; polycyclic pigments such as phthalocyanine pigment, perylene pigment, perinone pigment, anthraquinone pigment, quinacridone pigment, dioxazine pigment, thioindigo pigment, isoindolinone pigment, and quinophthalone pigment; dye chelate compounds such as basic dye chelate and acid dye chelate; nitro pigments; nitroso pigments; and aniline black.

Of the above-mentioned pigments, pigments having good affinity for water are preferably used in the present invention. It is preferable that the pigment have a particle size of 1 μm or less, and more preferably 0.16 μm or less. The pigment is preferably contained in the ink composition in an amount of 0.5 to 25 wt. %, more preferably 1 to 15 wt. %, and further preferably 1 to 10 wt. %.

Specific examples of the black pigments preferably used in the present invention include organic pigments such as carbon black (C.I. Pigment Black 7), i.e., furance black, lamp black, acetylene black, and channel black; copper oxide; iron oxide (C.I. Pigment Black 11); and aniline black (C.I. Pigment Black 1).

Specific examples of the color pigments preferably used in the present invention includes C.I. Pigment Yellow 1 (Fast Yellow G), 3, 12 (Disazo Yellow AAA), 13, 14, 17, 24, 34, 35, 37, 42 (yellow iron oxide), 53, 55, 81, 83 (Disazo Yellow HR), 95, 97, 98, 100, 101, 104, 108, 109, 110, 117, 120, 138, and 153; C.I. Pigment Orange 5, 13, 16, 17, 36, 43, and 51; C.I. Pigment Red 1, 2, 3, 5, 17, 22 (Brillant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (iron oxide red), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rhodamine Lake), 3, 5:1, 16, 19, 23, and 38; C.I. Pigment Blue 1, 2, 15 (Phthalocyanine Blue R), 15:1, 15:2, 15:3 (Phthalocyanine Blue E) 16, 17:1, 56, 60, and 63; and C.I. Pigment Green 1, 4, 7, 8, 10, 17, 18, and 36.

Further, a pigment such as carbon black may be surface-treated with a resin to prepare a graft pigment which can be dispersed in water, and surface-treated with a functional group such as a sulfonate group or a carboxyl group so as to be dispersed in water.

Furthermore, the pigment may be included in microcapsule to be dispersed in water.

When the black pigment is added to the formulation for the ink composition, it is preferable that the black pigment be dispersed in an aqueous medium using a dispersant to prepare a black pigment dispersion. The black pigment dispersion thus prepared may be added to the formulation for the recording ink composition. Any dispersants for preparing conventional pigment dispersions can be used.

Examples of the dispersant include polyacrylic acid, polymethacrylic acid, acrylic acid—acrylonitrile copolymer, vinyl acetate—acrylic ester copolymer, acrylic acid—alkyl acrylate copolymer, styrene—acrylic acid copolymer, styrene—methacrylic acid copolymer, styrene—acrylic acid—alkyl acrylate terpolymer, styrene—methacrylic acid—alkyl acrylate terpolymer, styrene—α-methyl styrene—acrylic acid terpolymer, styrene—α-methyl styrene—acrylate terpolymer, styrene—maleic acid copolymer, vinyl naphthalene—maleic acid copolymer, vinyl acetate—ethylene copolymer, vinyl acetate—fatty acid vinyl ethylene copolymer, vinyl acetate—maleic acid ester copolymer, vinyl acetate—crotonic acid copolymer, and vinyl acetate—acrylic acid copolymer.

In the presence invention, those copolymers and terpolymers of dispersants have a weight average molecular weight of 5,000 to 100,000, preferably 6,000 to 50,000, more preferably 7,000 to 30,000, and further preferably 8,000 to 15,000. The dispersant may be appropriately added to the pigment in such an amount that can stably disperse the pigment, in view of the advantages of the present invention. Specifically, the ratio by weight of the pigment to the dispersant is preferably in a range of (1:0.06) to (1:3), and more preferably (1:0.125) to (1:3).

The ink composition of the present invention comprises water as a medium. To obtain desired ink properties, prevent the ink from drying, and improve the solution stability, a water-soluble organic solvent is used in combination with water.

Specific examples of the water-soluble organic solvent for use in the present invention include polyhydric alcohols such as ethylene glycol, diethylene glycol, triethylene glycol, polyethylene glycol, propylene glycol, dipropylene glycol, tripropylene glygol, tetraethylene glycol, hexylene glycol, polypropylene glycol, 1,5-pentanediol, 1,6-hexanediol, glycerol, 1,2,6-hexanetriol, 1,2,4-butanetriol, 1,2,3-butanetriol, and 3-methyl-pentane-1,3,5-triol; alkyl ethers derived from polyhydric alcohols such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, and propylene glycol monoethyl ether; aryl ethers derived from polyhydric alcohols such as ethylene glycol monphenyl ether, and ethylene glycol monobenzyl ether; nitrogen-containing heterocyclic compounds such as 2-pyrrolidone, N-methyl-2-pyrrolidone, N-hydroxyethyl-2-pyrrolidone, 1,3-dimethylimidazolidinone, ε-caprolactam, and γ-butyrolactone; amides such as formamide, N-methylformamide, and N,N-dimethylformamide; amines such as monoethanol amine, diethanol amine, triethanol amine, monoethylamine, diethylamine, and triethylamine, sulfur-containing compounds such as dimethyl sulfoxide, sulfolane, and thiodiethanol; propylene carbonate; and ethylene carbonate. Those water soluble organic solvents may be used alone or in combination.

Of those water-soluble organic solvents, there are preferably employed diethylene glycol, thiodiethanol, polyethylene glycol (200 to 600), triethylene glycol, glycerol, 1,2,6-hexanetriol, 1,2,4-butanetriol, 3-methylpentane-1,3,5-triol, 1,5-pentanediol, 2-pyrrolidone, and N-methyl-2-pyrrolidone. Such organic solvents can effectively work not to lower the ink ejecting properties. Further, when the water-soluble organic solvent comprises at least one pyrrolidone derivative, in particular, 2-pyrrolidone, the quality of the obtained ink image can be improved.

As the wetting agent for use in the ink composition of the present invention, glycerin is preferably used. It is preferable that the ratio by weight of the wetting agent to the water-soluble organic solvent be in the range of (10:1) to (1:10) for imparting the well-balanced properties to the ink composition. In the case where glycerin is used as the wetting agent and diethylene glycol is used as the water-soluble organic solvent, the ratio by weight of the wetting agent to the water-soluble organic solvent is preferably within the range of (4:1) to (1:4). Other solvents than water, that is, a mixture of the water soluble organic solvent, wetting agent, and 2-ethyl-1,3-hexanediol is preferably contained in an amount of 1 to 30 wt. % of the total weight of the ink composition.

It is preferable that the ink composition of the present invention have a dynamic surface tension of 50 mJ/m$^2$ or less, more preferably 40 mJ/m$^2$ or less to obtain excellent drying characteristics of the ink image.

The surface tension of the recording ink composition can be used as an indication of the penetration properties of the ink composition into a recording paper. The surface tension means a dynamic surface tension measured within a short period of one second or less after the formation of the surface of a droplet on the recording paper.

The above-mentioned dynamic surface tension of the recording ink composition can be measured by any of the conventional methods, for example, by the method described in Japanese Laid-Open Patent Application No. 63-31237 herein incorporated by reference. In the present invention, the dynamic surface tension is determined by use of the Wilhelmy's surface balance.

For the purpose of adjusting the surface tension of the recording ink composition of the present invention, the above-mentioned polyols and/or glycol ethers may be employed. Further, following can also be employed: alkyl and aryl ethers derived from polyhydric alcohols such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; anionic surfactants; nonionic surfactants; fluorine-containing surfactants; and lower alcohols such as ethanol and 2-propanol. Especially preferred is diethylene glycol monobutyl ether.

The recording ink composition of the present invention may further comprises a resin emulsion. The resin emulsion for use in the present invention is an emulsion constituted by a continuous phase comprising water and a disperse phase comprising a resin. Examples of the resin for use in the resin emulsion are an acrylic resin, a vinyl acetate resin, a styrene—butadiene resin, a vinyl chloride resin, an acrylic—styrene resin, a butadiene resin, and a styrene resin.

It is preferable that the above-mentioned resin be a polymer having both a hydrophilic moiety and a hydrophobic moiety. The particle diameter of the resin for use in the resin emulsion is not particularly limited, but preferably about 150 nm or less, and more preferably about 5 to 100 nm.

The resin emulsion can be obtained by mixing the resin particles and water, with a surfactant being optionally added thereto. A self-dispersion type emulsion due to the presence of a hydrophilic group such as hydroxyl group can be prepared by using no surfactant. For example, an emulsion of an acrylic resin or a styrene—acrylic resin can be obtained by mixing (meth)acrylic ester or a mixture of styrene and (meth)acrylic ester, and water, with a surfactant being optionally added thereto. The ratio by weight of the resin to the surfactant is preferably in a range of about (10:1) to (5:1). Within the above-mentioned range, the resin is easily emulsified, and the water resistance and the penetrating properties of the obtained ink composition do not decrease.

For the preparation of the resin emulsion, it is proper that the amount of water be 60 to 400 parts by weight, preferably 100 to 200 parts by weight, with respect to 100 parts by weight of the resin.

There are various commercially available resin emulsions, for example, "Micro Gel E-1002" and "Micro Gel E-5002" (Trademark), which are styrene—acrylic resin emulsions manufactured by Niopon Paint Co., Ltd.; "Boncoat 4001" and "Boncoat 5454" (Trademark), which are respectively an acrylic resin emulsion and a styrene—acrylic resin emulsion, manufactured by Dainipoon Ink & Chemicals, Incorporated; "SAE-1014" (Trademark), which is a styrene—acrylic resin emulsion manufactured by Nippon Zeon Co., Ltd.; and "Saibinol SK-200" (Trademark), which is an acrylic resin emulsion manufactured by Saiden Chemical Industry Co., Ltd.

It is preferable that the resin emulsion comprise their resin component in an amount of 0.1 to 40 wt. %, more preferably 1 to 25 wt. % of the total weight of the ink composition.

The resin emulsion tends to thicken, thereby inhibiting the colorant from spreading and promoting the fixing properties of ink images to the recording material. When the ink composition is deposited on a recording material to form an ink image thereon, the resin emulsion for use in the ink composition can form a film on the recording material according to the kind of resin emulsion. In this case, the abrasion resistance of the obtained printed matter can be improved.

The recording ink may further comprise a sugar. Examples of the sugar are monosaccharide, disaccharide, oligosaccharide (including trisaccharide and quadrisaccharide), and polysaccharide. Preferable examples of the sugar for use in the present invention include glucose, mannose, fructose, ribose, xylose, arabinose, galactose, maltose, cellobiose, lactose, sucrose, trehalose, and maltotriose. The polysaccharides herein use include the substances occurring in nature such as α-cyclodextrin and cellulose.

Derivatives of those sugars can also be used for the ink composition. There are, for example, reducing sugars such as sugar alcohol represented by general formula of $HOCH_2(CHOH)_nCH_2OH$, wherein n is an integer of 2 to 5, oxidized sugars such as aldonic acid and uronic acid, amino acids, and thioacids. In particular, the sugar alcohols, i.e., maltol and sorbitol are preferred. It is proper that the sugar be contained in an amount of 0.1 to 40 wt. %, preferably 0.5 to 30 wt. % of the total weight of the recording ink composition:

The recording ink composition of the present invention may further comprise any conventional additives such as a preservative, pH controlling agent, chelating agent, and rust inhibitor.

Examples of the preservatives include sodium dehydroacetate, sodium sorbate, sodium 2-pyridine thiol-1-oxide, sodium benzoate, and pentachloro sodium phenolate.

As the pH controlling agent, any materials can be used as long as the ink composition can be adjusted to pH 7 or more without being adversely affected. Examples of the pH controlling agent for use in the present invention include amines such as diethanolamine and triethanolamine; hydroxides of alkali metal such as lithium hydroxide, sodium hydroxide, and potassium hydroxide, and other hydroxides such as ammonium hydroxide, quaternary ammonium hydroxide, and quaternary phosphonium hydroxide; and alkali metal carbonates such as lithium carbonate, sodium carbonate, and potassium carbonate.

Examples of the chelating agent for use in the ink composition include sodium ethylenediamine tetraacetate, sodium nitrilotriacetate, sodium hydroxethyl ethylenediamine triacetate, sodium diethylenetriamine pentaacetate, and sodium lauryl diacetate.

Examples of the rust inhibitor include acid sulfite, sodium thiosulfate, antimony thiodiglycolate, diisopropyl ammonium nitrite, pentaerythritol tetranitrate, dicylochexyl ammonium nitrite.

In addition, a water-soluble ultraviolet absorber, a water-soluble infrared absorber, and a surfactant other than the aforementioned surfactants (I) to (V) may be added to the recording ink composition, as required.

Other features of this invention will become apparent in the course of the following description of exemplary embodiments, which are given for illustration of the invention and are not intended to be limiting thereof.

EXAMPLE 1

A mixture of the following components was stirred:

|  | wt. % |
| --- | --- |
| Carbon black dispersion (made by Dainichiseika Color & Chemicals Mfg. Co., Ltd.) | 5 |
| Glycerin | 5 |
| Diethylene glycol | 15 |
| 2-ethyl-1,3-hexanediol | 2 |
| 2-pyrrolidone | |
| Anionic surfactant "ECTD-3NEX" (Trademark), made by Nikko Chemicals Co., Ltd. (represented by formula (I)) | 0.3 |
| Deionized water | Balance |

The thus obtained mixture was adjusted to pH 9 by the addition of 10% aqueous solution of lithium hydroxide.

The resultant mixture was then filtered through a 0.8 μm membrane filter, whereby an ink composition No. 1 according to the present invention was obtained.

EXAMPLE 2

A mixture of the following components was stirred:

|  | wt. % |
| --- | --- |
| Sulfone-group-addition type carbon black (made by Cabot Speciality Chemicals Inc.) | 5 |
| Glycerin | 5 |
| Ethylene glycol | 15 |
| 2-ethyl-1,3-hexanediol | 3 |
| 2-pyrrolidone | 2 |
| Anionic surfactant "ECTD-6NEX" (Trademark), made by Nikko Chemicals Co., Ltd. (represented by formula (I)) | 0.5 |
| Sodium alginate "NSPLL" (Trademark) (made by Kibun Food Chemifa Co., Ltd.) | 0.15 |
| Deionized water | Balance |

The thus obtained mixture was adjusted to pH 9 by the addition of 10% aqueous solution of sodium hydroxide.

The resultant mixture was then filtered through a 0.8 μm membrane filter, whereby an ink composition No. 2 according to the present invention was obtained.

EXAMPLE 3

A mixture of the following components was stirred:

|  | wt. % |
| --- | --- |
| Carboxyl-group-addition type carbon black (made by Cabot Speciality Chemicals Inc.) | 5 |
| Glycerin | 5 |
| Propylene glycol | 10 |
| 2-ethyl-1,3-hexanediol | 1 |
| 2-pyrrolidone | 2 |
| Sodium dicetylsulfosuccinate "Marpomerce CT" (Trademark), made by Matsumoto Yushi-Seiyaku Co., Ltd. (represented by formula (II)) | 1 |
| Acrylic resin emulsion "Z116" (Trademark), made by Mitsui Chemicals, Inc. (minimum fusion temperature = 7° C.) | 3 |
| Deionized water | Balance |

The thus obtained mixture was adjusted to pH 9 by the addition of 10% aqueous solution of lithium hydroxide.

The resultant mixture was then filtered through a 0.8 μm membrane filter, whereby an ink composition No. 3 according to the present invention was obtained.

EXAMPLE 4

A mixture of the following components was stirred:

|  | wt. % |
| --- | --- |
| Carbon black included in microcapsules (made by Dainippon Ink & Chemicals Incorporated) | 5 |
| Glycerin | 5 |
| Dipropylene glycol | 15 |
| 2-ethyl-1,3-hexanediol | 2 |
| 2-pyrrolidone | 2 |
| Sodium dioctylsulfosuccinate "Marpomerce PT" (Trademark), made by Matsumoto Yushi-Seiyaku Co., Ltd. (represented by formula (II)) | 1 |
| Deionized water | Balance |

The thus obtained mixture was adjusted to pH 9 by the addition of 10% aqueous solution of lithium hydroxide.

The resultant mixture was then filtered through a 0.8 μm membrane filter, whereby an ink composition No. 4 according to the present invention was obtained.

EXAMPLE 5

A mixture of the following components was stirred:

|  | wt. % |
|---|---|
| Carbon black dispersion (made by Dainichiseika Color & Chemicals Mfg. Co., Ltd.) | 5 |
| Glycerin | 5 |
| Hexylene glycol | 10 |
| 2-ethyl-1,3-hexanediol | 1 |
| 2-pyrrolidone | 2 |
| Nonionic surfactant "Nonipol 60" (Trademark), made by Sanyo Chemical Industries, Ltd. (represented by formula (III)) | 0.3 |
| Deionized water | Balance |

The thus obtained mixture was adjusted to pH 9 by the addition of 10% aqueous solution of sodium hydroxide.

The resultant mixture was then filtered through a 0.8 μm membrane filter, whereby an ink composition No. 5 according to the present invention was obtained.

EXAMPLE 6

A mixture of the following components was stirred:

|  | wt. % |
|---|---|
| Sulfone-group-addition type carbon black (made by Cabot Speciality Chemicals Inc.) | 5 |
| Glycerin | 5 |
| Triethylene glycol | 15 |
| 2-ethyl-1,3-hexanediol | 2 |
| 2-pyrrolidone | 2 |
| Nonionic surfactant "BT-7" (Trademark), made by Nikko Chemicals Co., Ltd, (represented by formula (IV)) | 0.5 |
|  | 0.5 |
| Deionized water | Balance |

The thus obtained mixture was adjusted to pH 8 by the addition of 10% aqueous solution of lithium hydroxide.

The resultant mixture was then filtered through a 0.8 μm membrane filter, whereby an ink composition No. 6 according to the present invention was obtained.

EXAMPLE 7

A mixture of the following components was stirred:

|  | wt. % |
|---|---|
| Carboxyl-group-addition type carbon black (made by Cabot Speciality Chemicals Inc.) | 5 |
| Glycerin | 5 |
| Tetraethylene glycol | 20 |
| 2-ethyl-1,3-hexanediol | 3 |
| N-methyl-2-pyrrolidone | 2 |
| Nonionic surfactant "Pepol A-0690" (Trademark), made by Toho Chemical Industry Co., Ltd. (represented by formula (V)) | 1.0 |
| Deionized water | Balance |

The thus obtained mixture was adjusted to pH 9 by the addition of 10% aqueous solution of lithium hydroxide.

The resultant mixture was then filtered through a 0.8 μm membrane filter, whereby an ink composition No. 7 according to the present invention was obtained.

EXAMPLE 8

A mixture of the following components was stirred:

|  | wt. % |
|---|---|
| Carbon black included in microcapsules (made by Dainippon Ink & Chemicals, Incorporated) | 5 |
| Glycerin | 5 |
| 1,5-pentanediol | 10 |
| 2-ethyl-1,3-hexanediol | 2 |
| 2-pyrrolidone | 2 |
| Nonionic surfactant "Pepol AS-053X" (Trademark), made by Toho Chemical Industry Co., Ltd. (represented by formula (V)) | 1.5 |
| Deionized water | Balance |

The thus obtained mixture was adjusted to pH 8 by the addition of 10% aqueous solution of sodium hydroxide.

The resultant mixture was then filtered through a 0.8 μm membrane filter, whereby an ink composition No. 8 according to the present invention was obtained.

COMPARATIVE EXAMPLE 1

The procedure for preparation of the ink composition No. 1 in Example 1 was repeated except that the anionic surfactant "ECTD-3NEX" (Trademark), made by Nikko Chemicals Co., Ltd., for use in the formulation in Example 1 was replaced by the commercially available surfactant "Surfy-nol 82" (Trademark), made by Air Products and Chemicals Inc., and that 2-ethyl-1,3-hexanediol for use in the formulation in Example 1 was replaced by ethylene glycol monomethyl ether.

Thus, a comparative ink composition No. 1 was obtained.

COMPARATIVE EXAMPLE 2

The procedure for preparation of the ink composition No. 3 in Example 3 was repeated except that the sodium dicetylsulfosuccinate "Marpomerce CT" (Trademark), made by Matsumoto Yushi-Seiyaku Co., Ltd., for use in the formulation in Example 3 was replaced by the commercially available surfactant "Surfy-Nol 104" (Trademark), made by Air Products and Chemicals Inc., and that 2-ethyl-1,3-hexanediol for use in the formulation in Example 3 was replaced by ethylene glycol monoethyl ether.

Thus, a comparative ink composition No. 2 was obtained.

COMPARATIVE EXAMPLE 3

The procedure for preparation of the ink composition No. 5 in Example 5 was repeated except that the nonionic surfactant "Nonpol 60" (Trademark), made by Sanyo Chemical Industries, Ltd., for use in the formulation in Example 5 was replaced by the commercially available surfactant "Surfy-nol 440" (Trademark), made by Air Products and Chemicals Inc., and that 2-ethyl-1,3-hexanediol for use in the formulation in Example 5 was replaced by ethylene glycol monobutyl ether.

Thus, a comparative ink composition No. 3 was obtained.

COMPARATIVE EXAMPLE 4

The procedure for preparation of the ink composition No. 6 in Example 6 was repeated except that the nonionic surfactant "BT-7" (Trademark), made by Nikko Chemicals Co., Ltd., for use in the formulation in Example 6 was replaced by the commercially available surfactant "Surfynol 365" (Trademark), made by Air Products and Chemicals Inc., and that 2-ethyl-1,3-hexanediol for use in the formulation of Example 6 was replaced by diethylene glycol monomethyl ether.

Thus, a comparative ink composition No. 4 was obtained.

COMPARATIVE EXAMPLE 5

The procedure for preparation of the ink composition No. 7 in Example 7 was repeated except that the nonionic surfactant "Pepol A-0638" (Trademark), made by Toho Chemical Industry Co., Ltd., for use in the formulation in Example 7 was replaced by the commercially available surfactant "Surfy-nol 485" (Trademark), made by Air Products and Chemicals Inc., and that 3-ethyl-1,3-hexanediol for use in the formulation in Example 7 was replaced by diethylene glycol monobutyl ether.

Thus, a comparative ink composition No. 5 was obtained.

The ink compositions Nos. 1 to 8 of the present invention, respectively prepared in Examples 1 to 8, and the comparative ink compositions Nos. 1 to 5, respectively prepared in Comparative Examples 1 to 5 were subjected to the following tests:

[Image Clearness Inspection Test]

Each ink composition was separately filled into a commercially available ink-jet printer "MJ-930C" (Trademark) with a head having 360 dpi nozzles, manufactured by Seiko Epson Corporation. Yellow, magenta, and cyan inks were ejected by 100% duty to form the respective solid images, and a black ink was ejected to form a character image. The amount of ink ejected was set at 0.07 $\mu$g/dot. In this test, ink-jet printing was conducted on eight kinds of papers (1) to (8) listed below.

(1) "My Paper" (Trademark), available from MBS RICOH Co., Ltd.
(2) Recycled paper, "Shigen S" (Trademark), available from NBS RICOH Co., Ltd.
(3) "PB Paper" (Trademark), available from CANON Inc.
(4) "Multi Ace" (Trademark), available from Fuji Xerox Office Supply Co., Ltd.
(5) Recycled paper, "Yamayure" (Trademark) manufactured by Honshu Paper Co., Ltd.
(6) "LH Paper" (Trademark), available from Fuji Xerox Office Supply Co., Ltd.
(7) "Xeron 4024 Paper" (Trademark), available from Fuji Xerox Office Supply Co., Ltd.
(8) "Neenah Bond Paper" (Trademark), manufactured by Kimberley-Clark Corporation After the printed color images were dried, the image quality of the printed color images was evaluated by the composition of visual inspection and observation using a reflection color spectrocolorimeter (manufactured by X-Rite, Incorporated) in terms of the feathering (image blurring), the color bleeding (blurring at the boundaries of a secondary color obtained by superimposing two color ink compositions), the optical density (OD), and the strike-through (optical density of the ink image measured from the rear surface of each paper).

The results are shown in TABLE 1. The evaluation of the feathering and the color bleeding were carried out on four levels. The evaluation criterion is as follows:

⊚: Excellent. Clear images were formed on all kinds of papers without image blurring.

○: Good. Slight image blurring was observed in some papers, but acceptable for practical use.

Δ: Slightly poor. Whisker-like blurring was observed in all the papers.

X: Very poor. The outlines of character images became obscure because image blurring was very noticeable.

[Drying characteristics Inspection Test]

A sheet of filter paper was brought into pressure contact with the printed ink image immediately after the ink image was printed on the above-mentioned eight kinds of papers. The drying characteristics of the ink compositions were expressed by the length of time from the contact of the filter paper with the printed ink image until no more ink was transferred to the filter paper.

The maximum length of time obtained among the eight kinds of papers is given as the evaluation result in Comparative Examples 1 to 5.

[Preservation Stability Test]

Four samples of each ink composition were separately placed in a polyethylene container, and allowed to stand at −20° C., 5° C., 20° C., and 70° C. for three months. After the storage of three months, the presence or absence of a precipitate in each sample was visually inspected, and the changes in the physical properties such as the surface tension and viscosity were inspected.

The results are shown in TABLE 1. Mark "○" indicates that no changes in the physical properties were observed under any of the above-mentioned preservation temperature conditions.

[Ink-ejection Performance Reliability Test]

Each ink composition was filled into an ink-jet printer. The printing operation was continuously carried out without capping the printer head and also without cleaning the nozzles. The printing operation was resumed after some intermission.

The ink-ejecting reliability of each ink composition was evaluated by a permissible intermission time or a decapping time (sec.), namely, the time from starting by the printing operation with the nozzles being decapped until the direction in which the ink composition was ejected from one of the decapped nozzles was deviated from its original direction, or by the changes in the weight of the ejected ink droplets.

The results are shown in TABLE 1.

TABLE 1

|  | Image Clearness | | | | | | |
| --- | --- | --- | --- | --- | --- | --- | --- |
|  | Feathering | Color bleeding | OD | Strike-through (OD) | Drying Characteristics | Preservation Stability (sec.) | Ink-ejection Reliability (sec.) |
| Ex. 1 | ◉ | ◉ | 1.57 | 0.10 | <1 | ○ | >600 |
| Ex. 2 | ◉ | ◉ | 1.59 | 0.09 | <1 | ○ | >600 |
| Ex. 3 | ◉ | ◉ | 1.53 | 0.08 | <1 | ○ | 500 |
| Ex. 4 | ◉ | ◉ | 1.55 | 0.10 | <1 | ○ | 550 |
| Ex. 5 | ◉ | ◉ | 1.57 | 0.07 | <1 | ○ | 500 |
| Ex. 6 | ◉ | ◉ | 1.59 | 0.09 | <1 | ○ | 450 |
| Ex. 7 | ◉ | ◉ | 1.60 | 0.11 | <1 | ○ | 500 |
| Ex. 8 | ◉ | ◉ | 1.58 | 0.08 | <1 | ○ | 550 |
| Comp. Ex. 1 | ○ | ○ | 1.21 | 0.35 | 30 | ○ | 300 |
| Comp. Ex. 2 | ○ | Δ | 1.32 | 0.39 | 45 | precipitate | 250 |
| Comp. Ex. 3 | ○ | ○ | 1.34 | 0.34 | 42 | ○ | 310 |
| Comp. Ex. 4 | Δ | Δ | 1.22 | 0.38 | 35 | ○ | 150 |
| Comp. Ex. 5 | ○ | ○ | 1.18 | 0.38 | 32 | ○ | 200 |

As previously explained, the wettability of both a sheet of plain paper and a sheet of coated paper for use in ink-jet printing by the recording ink composition is improved. The ink composition of the present invention exhibits excellent penetrating properties, so that color ink images with satisfactory drying characteristics can be obtained with minimum image deterioration.

Japanese Patent Application No. 11-263445 filed Sep. 17, 1999 is hereby incorporated by reference.

What is claimed is:

1. A recording ink composition comprising:

a colorant insoluble and dispersible in water, water, a water-soluble organic solvent, a wetting agent, 2-ethyl-1,3-hexanediol, and a surfactant selected from the group consisting of surfactants of formulas (I) to (V):

$$R^1—O—(CH_2CH_2O)_m CH_2COO^-M^+ \quad (I)$$

wherein $R^1$ is a straight-chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12, $$\begin{array}{c} CH_2COO—R^2 \\ | \\ M^+O_3^-SCHCOO—R^2 \end{array} \quad (II)$$

wherein $R^2$ is a branched alkyl group having 5 to 16 carbon atoms, and $M^-$ is a cation selected from the group consisting of alkali metal cation, quaternary ammonium cation, quaternary phosphonium cation, and alkanol amine cation,

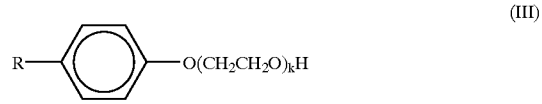

(III)

wherein R is a straight or branched carbon chain having 6 to 14 carbon atoms, and k is an integer of 5 to 20, $$R—(OCH_2CH_2)_n OH \quad (IV)$$

wherein R is a straight or branched carbon chain having 6 to 14 carbon atoms, and k is an integer of 5 to 20, and

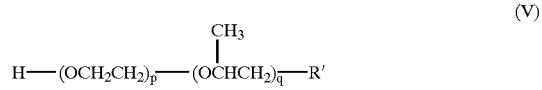

(V)

wherein R' is a carbon chain having 6 to 14 carbon atoms, and p and q are each an integer of 20 or less.

2. The recording ink composition as claimed in claim 1, wherein said 2-ethyl-1,3-hexanediol is contained in an amount of 0.1 to 7.0 wt. % of the total weight of said recording ink composition.

3. The recording ink composition as claimed in claim 1, wherein said surfactant is contained in an amount of 0.1 to 5.0 wt. % of the total weight of said recording ink composition.

4. The recording ink composition as claimed in claim 1, wherein, in formulas (I) and (II), said alkali metal cation represented by $M^+$ is selected from the group consisting of $N^+$ and $Li^-$; said quaternary ammonium cation represented by $M^+$ is a cation represented by formula (VI),

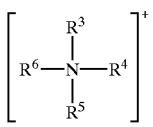
(VI)

wherein $R^3$ to $R^6$ are each selected from the group consisting of a hydrogen atom, an alkyl group having 1 to 4 carbon atoms, and a halogenated alkyl group having 1 to 4 carbon atoms; said quaternary phosphonium cation represented by $M^+$ is a cation represented by formula (VII),

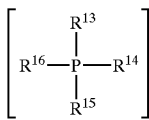
(VII)

wherein $R^{13}$ to $R^{16}$ are each selected from the group consisting of a hydrogen atom, an alkyl group having 1 to 4 carbon atoms, a hydroxyalkyl group having 1 to 4 carbon atoms, and a halogenated alkyl group having 1 to 4 carbon atoms; and said alkanol amine cation represented by $M^+$ is a cation represented by formula (VIII),

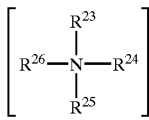
(VIII)

wherein at least one of $R^{23}$ to $R^{26}$ is a hydroxyalkyl group having 1 to 4 carbon atoms, and the other is selected from the group consisting of a hydrogen atom, an alkyl group having 1 to 4 carbon atoms, and a halogenated alkyl group having 1 to 4 carbon atoms.

5. The recording ink composition as claimed in claim 1, wherein said water-soluble organic solvent comprises at least one selected from the group consisting of ethylene glycol, diethylene glycol, triethylene glycol, propylene glycol, dipropylene glycol, tripropylene glycol, 1,5-pentanediol, tetraethylene glycol, and hexylene glycol.

6. The recording ink composition as claimed in claim 5, wherein said wetting agent is glycerin, and the ratio by weight of said wetting agent to said water-soluble organic solvent is in a range of (10:1) to (1:10).

7. The recording ink composition as claimed in claim 5, wherein said wetting agent is glycerin, and said water-soluble organic solvent is diethylene glycol, with the ratio by weight of said wetting agent to said water-soluble organic solvent being in a range of (4:1) to (1:4).

8. The recording ink composition as claimed in claim 1, wherein a mixture of said water-soluble organic solvent, said wetting agent, and said 2-ethyl-1,3-hexanediol is in an amount of 1 to 30 wt. % of the total weight of said recording ink composition.

9. The recording ink composition as claimed in claim 1, wherein said colorant comprises a pigment which is contained in an amount of 0.5 to 25 wt. % of the total weight of said recording ink composition.

10. The recording ink composition as claimed in claim 9, wherein said pigment has a particle diameter of 1 μm or less.

11. The recording ink composition as claimed in claim 9, wherein said pigment is in the form of a dispersion prepared by dispersing said pigment in water using a dispersant.

12. The recording ink composition as claimed in claim 11, wherein said dispersant is a polymer dispersant having a weight average molecular weight of 5,000 to 100,000.

13. The recording ink composition as claimed in claim 1, wherein said water-soluble organic solvent comprises a pyrrolidone derivative.

14. The recording ink composition as claimed in claim 1, further comprising a resin emulsion.

15. A method of recording images on an image receiving medium, comprising the step of ejecting a recording ink composition in the form of droplets from a recording head onto said image receiving medium, thereby forming images thereon, said recording ink composition comprising:

a colorant insoluble and dispersible in water,
water,
a water-soluble organic solvent,
a wetting agent,
2-ethyl-1,3-hexanediol, and
a surfactant selected from the group consisting of surfactants of formulas (I) to (V):

(I)

wherein $R^1$ is a straight-chain or branched alkyl group having 6 to 14 carbon atoms, $M^+$ is a cation selected from the group consisting of alkali metal cation, quaternary ammonium cation, quaternary phosphonium cation, and alkanol amine cation, and m is an integer of 3 to 12,

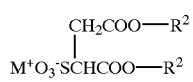
(II)

wherein $R^2$ is a branched alkyl group having 5 to 16 carbon atoms, and $M^+$ is a cation selected from the group consisting of alkali metal cation, quaternary ammonium cation, quaternary phosphonium cation, and alkanol amine cation,

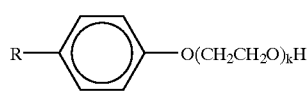
(III)

wherein R is a straight or branched carbon chain having 6 to 14 carbon atoms, and k is an integer of 5 to 20,

(IV)

wherein R is a straight or branched carbon chain having 6 to 14 carbon atoms, and k is an integer of 5 to 20, and

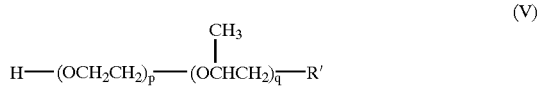
(V)

wherein R' is a carbon chain having 6 to 14 carbon atoms, and p and q are each an integer of 20 or less.

* * * * *